United States Patent [19]
Igari et al.

[11] Patent Number: 6,119,838
[45] Date of Patent: Sep. 19, 2000

[54] ONE-WAY CLUTCH

[75] Inventors: Kozaburo Igari, Shizuoka-ken; Masanori Tateishi, Fuji; Yasuhide Takasu, Shizuoka-ken, all of Japan

[73] Assignee: NSK-Warner K.K., Tokyo, Japan

[21] Appl. No.: 09/305,671

[22] Filed: May 5, 1999

[30] Foreign Application Priority Data

May 11, 1998 [JP] Japan .................................. 10-127203

[51] Int. Cl.⁷ .................................................. F16D 41/07
[52] U.S. Cl. ........................................ 192/45.1; 192/41 A
[58] Field of Search ................ 192/45.1, 41 A

[56] References Cited

U.S. PATENT DOCUMENTS

| | | | |
|---|---|---|---|
| 3,049,206 | 8/1962 | Zlotek | 192/45.1 |
| 3,302,761 | 2/1967 | Zlotek | 192/45.1 |
| 3,545,581 | 12/1970 | Kent | 192/45.1 |
| 4,130,191 | 12/1978 | Judd et al. | 192/41 A |
| 4,360,093 | 11/1982 | Wakabayashi et al. | 192/41 A |
| 5,038,903 | 8/1991 | Akagi et al. | 192/41 A |
| 5,427,600 | 6/1995 | Itoh et al. | 75/232 |
| 5,664,653 | 9/1997 | Kurita et al. | 192/45.1 |
| 5,690,032 | 11/1997 | Koga et al. | 192/45.1 X |
| 5,819,899 | 10/1998 | Iga et al. | 192/45.1 |

*Primary Examiner*—Rodney H. Bonck
*Attorney, Agent, or Firm*—Vorys, Sater, Seymour and Pease LLP

[57] ABSTRACT

In a one-way clutch provided with an outer race, an inner race disposed for rotation relative to the outer race, a sprag disposed between the outer race and the inner race for transmitting torque, a holder for holding the sprag, and a garter spring for biasing the sprag in a direction of torque transmission, a stepped portion or a groove portion is provided on an axial side of the sprag and the garter spring is held on the stepped portion or the groove portion. The stepped portion or grooved portion serves to indicate the proper orientation of the sprag during assembly into the clutch and enhances the workability of the sprag.

11 Claims, 6 Drawing Sheets

ONE-WAY CLUTCH

BACKGROUND OF THE INVENTION

1. Field of the Invention

This invention relates to a one-way clutch (cam clutch) for use as a part for torque transmission, back stop or the like in the driving apparatus of, for example, an automobile (particularly an automatic transmission for an automobile), a two-wheeled vehicle, an industrial machine or the like.

2. Related Background Art

A one-way clutch shown, for example, in FIGS. 10 and 11 of the accompanying drawings is generally known and is provided with a garter spring for biasing a sprag functioning as a cam in a direction of torque transmission.

In FIGS. 10 and 11, the one-way clutch 50 is provided with an outer race 52, an inner race 53 concentric with the outer race 52 and disposed for rotation relative to the outer race, a plurality of sprags 56 disposed between the outer race 52 and the inner race 53 for transmitting torque, a holder 54 for holding the sprags 56, and a garter spring 58 for biasing the sprags 56 in a direction of torque transmission.

As can be seen from FIG. 11, the garter spring 58 is fitted in a U-shaped groove formed substantially at the center of the axial width of the sprags 56 inwardly from the radially outer peripheral surface thereof. In this state, the garter spring 58 holds the sprags 56 between itself and the outer peripheral surface of the inner race 53, and biases the sprags 56 in the direction of torque transmission.

However, the conventional groove is of a shape difficult to manufacture. Since cutting has been used for the working thereof, the working property has been bad and the cost has been high.

Also, there has been the problem that it is not been easy for an unskilled worker to discriminate the proper orientation of the sprags during assembly.

SUMMARY OF THE INVENTION

The present invention has as a principal object to solve these problems and to provide an inexpensive one-way clutch.

To solve the above-noted problems, the one-way clutch of the present invention is a one-way clutch provided with an outer race, an inner race disposed for rotation relative to said outer race, a sprag disposed between said outer race and said inner race for transmitting torque, a holder for holding said sprag, and a garter spring for biasing said sprag in a direction of torque transmission, characterized in that a stepped portion or a groove portion is provided on an axial side of said sprag, and said garter spring is held on said stepped portion or in said groove portion.

Also, an integral bearing type one-way clutch of the present invention comprises a one-way clutch portion provided with an outer race, an inner race disposed for rotation relative to said outer race, a sprag disposed between said outer race and said inner race for transmitting torque, a holder for holding said sprag, a garter spring for biasing said sprag in a direction of torque transmission, and a bearing portion sharing the outer race and/or the inner race with said one-way clutch portion, and provided with rolling members rolling between said outer race and said inner race and a rolling member holder for holding said rolling members, characterized in that a stepped portion or a groove portion is provided on an axial side of said sprag, and said garter spring is held by said stepped portion or said groove portion and said holder or said rolling member holder.

The stepped portion or the groove portion is provided on only an axial side of the sprag and the garter spring is disposed thereon, and the garter spring is held by the side portion of the sprag and a sprag holding member.

Also, the stepped portion or the groove portion is formed by plastic working such as pressing or forging.

Accordingly, as compared with the prior art, the working property is improved, and plastic working techniques such as pressing or forging have become possible for the stepped portion or the groove portion and therefore, manufacture has become more efficient than in the prior art.

Also, the stepped portion or the groove portion is provided on only one side of the sprag, whereby the proper orientation of the sprag is to discriminate.

DETAILED DESCRIPTION OF THE PREFERRED EMBODIMENTS

Some embodiments of the present invention will hereinafter be described in detail with reference to the accompanying drawings.

First Embodiment

Figure 1:
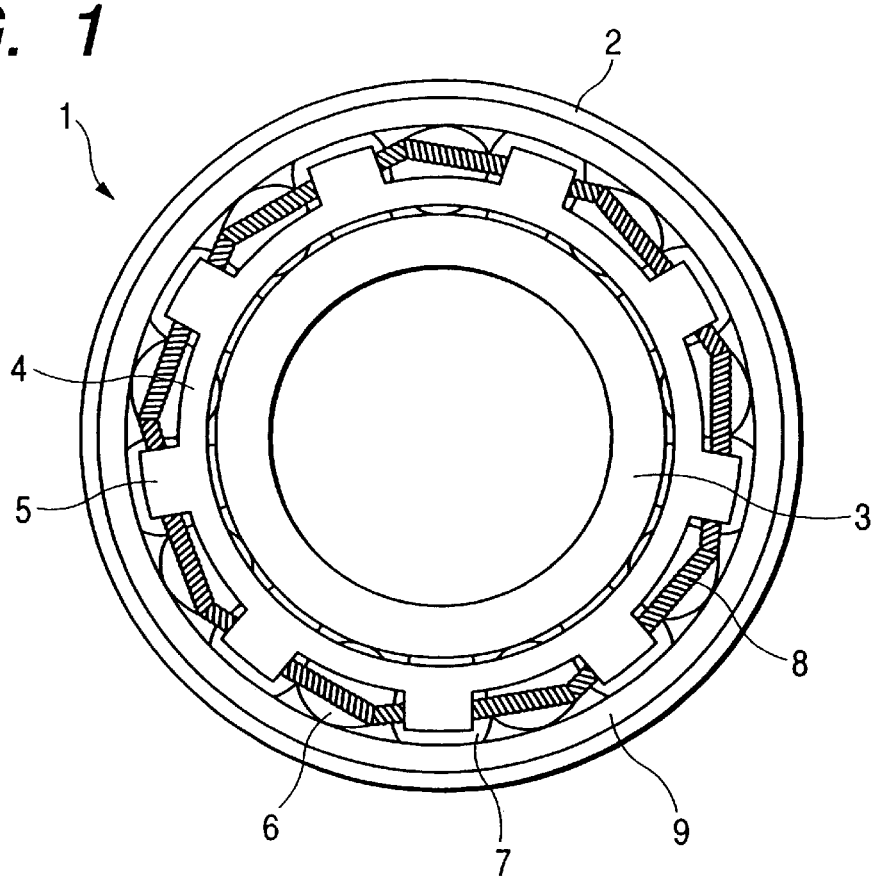
FIG. 1 is a front view of an integral bearing type one-way clutch according to a first embodiment of the present invention.
Figure 2:
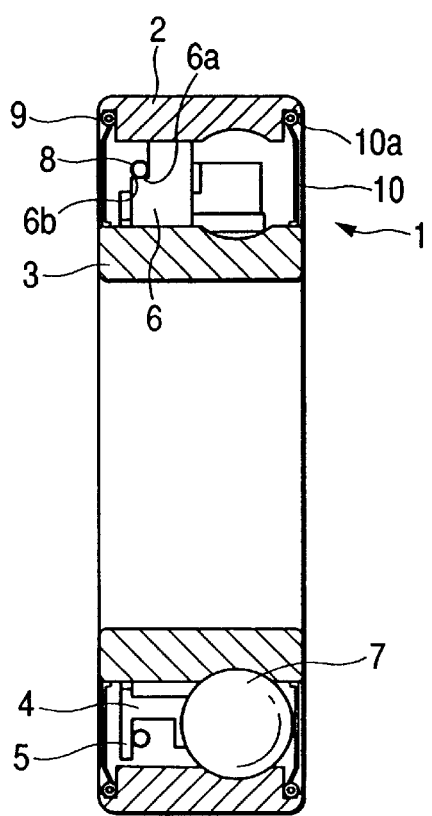
FIG. 2 is an axial cross-sectional view of the one-way clutch of FIG. 1.

FIG. 1 is a front view showing an integral bearing type one-way clutch 1 according to a first embodiment of the present invention, and FIG. 2 is an axial cross-sectional view thereof.

In FIGS. 1 and 2, the integral bearing type one-way clutch 1 is an integral bearing type one-way clutch in which a one-way clutch portion and a bearing portion use an outer race 2 and an inner race 3 in common. However, it may be of a type in which the one-way clutch portion and the bearing portion use only one of the outer race and the inner race in common.

The integral bearing type one-way clutch 1 has the outer race 2, the inner race 3 concentric with the outer race 2 and rotatable relative to the outer race 2, a plurality of sprags 6 circumferentially equidistantly provided to transmit torque between the outer race 2 and the inner race 3, and spherical rolling members 7 disposed axially adjacent to the sprags 6 and rolling between the outer race 2 and the inner race 3. The inner race 3 is cylindrical and has a rotary shaft, not shown, fitted therein.

The integral bearing type one-way clutch 1 further has an annular holder 4 for holding the sprags 6, a garter spring 8 for giving the sprags a biasing force in a direction of torque transmission (a direction for meshing with the inner peripheral surface of the outer race 2 and the outer peripheral surface of the inner race 3), and annular enveloping member 10 (not shown in FIG. 1) fitted between the outer race 2 and the inner race 3 and enveloping the one-way clutch portion and the bearing portion therein. The enveloping members 10 are provided at axially opposite ends, and have bent portions 10*a* on the radially outer edges thereof, and these bent portions 10*a* are fitted in grooves 9 formed in the inner periphery of the axially opposite ends of the outer race 2.

The holder 4 has radially outwardly protruding flange portions 5. The flange portions 5 hold the garter spring 8 along the sprags 6.

As shown in FIG. 2, each sprag 6 is provided with a radially extending stepped portion 6*a* on an axial side opposite to the rolling member 7, and the garter spring 8 is held on the upper surface 6*b* of this stepped portion 6*a*. The stepped portion 6*a* is formed by plastic working such as pressing or forging. Accordingly, the garter spring 8 urges the sprags 6 against the outer peripheral surface of the inner race 3 through the upper surfaces 6*b* of the stepped portions 6*a*, and give the sprags 6 a biasing force in a direction to transmit torque between the outer race 2 and the inner race 3.

Second Embodiment

Figure 3:
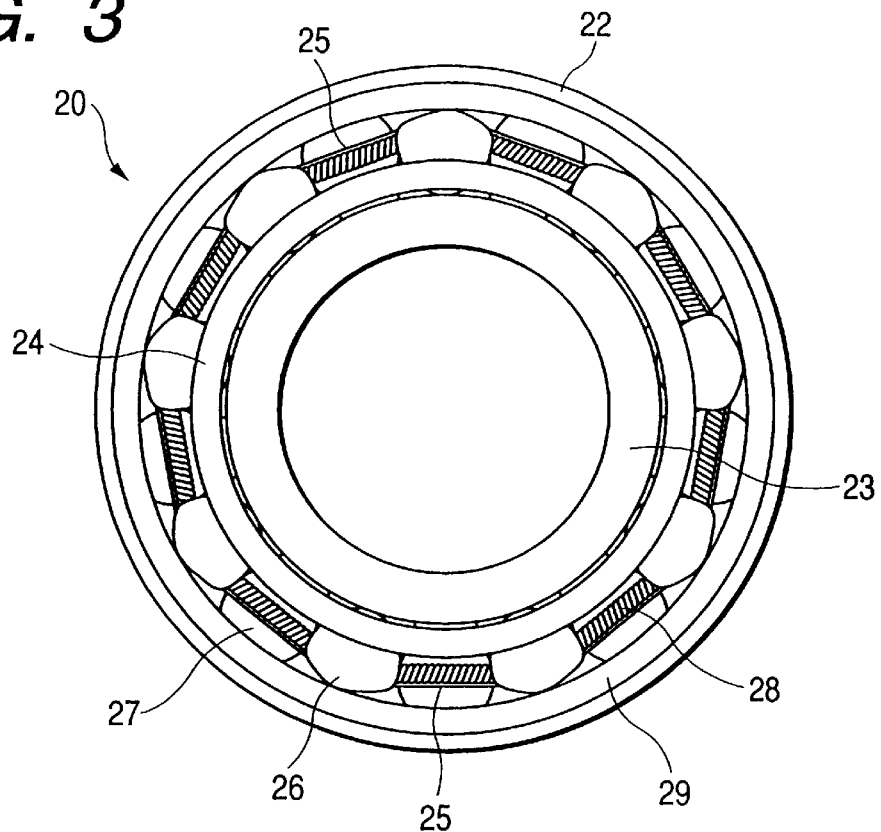
FIG. 3 is a front view of an integral bearing type one-way clutch according to a second embodiment of the present invention.
Figure 4:
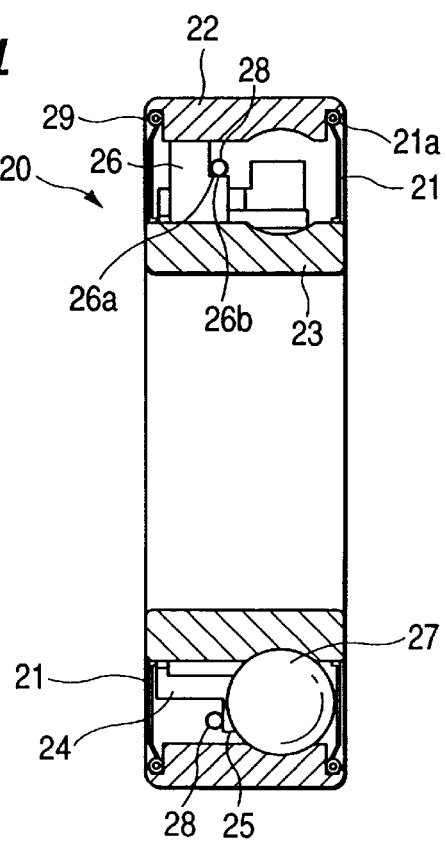
FIG. 4 is an axial cross-sectional view of the one-way clutch of FIG. 3.

FIG. 3 is a front view showing an integral bearing type one-way clutch 20 according to a second embodiment of the present invention, and FIG. 4 is an axial cross-sectional view thereof.

Again in the second embodiment, as in the first embodiment, the one-way clutch portion and the bearing portion of the integral bearing type one-way clutch 20 use an outer race 22 and an inner race 23 in common. As in the first embodiment, the one-way clutch may be of the type in which the one-way clutch portion and the bearing portion use only one of the outer race and the inner race in common.

The integral bearing type one-way clutch 20 has the outer race 22, the inner race 23 concentric with the outer race 22 and rotatable relative to the outer race, a plurality of sprags 26 circumferentially equidistantly provided to a transmit torque between the outer race 22 and the inner race 23, and spherical rolling members 27 disposed axially adjacent to the sprags 26 and rolling between the outer race 22 and the inner race 23. The inner race 23 is cylindrical, and has a rotary shaft, not shown, fitted therein.

The integral bearing type one-way clutch 20 further has an annular holder 24 for holding the sprags 26, a garter spring 28 for giving the sprags 26 a biasing force in a direction of torque transmission (a direction for meshing with the inner peripheral surface of the outer race 22 and the outer peripheral surface of the inner race 23), and annular enveloping members 21 (not shown in FIG. 3) fitted between the outer race 22 and the inner race 23 and enveloping the one-way clutch portion and the bearing portion therein. The enveloping members 21 are provided at axially opposite ends, and have bent portions 21*a* on the radially outer edges thereof, and these bent portions 21*a* are fitted in grooves 29 formed in the inner periphery of the axially opposite ends of the outer race 22.

As shown in detail in the lower half of FIG. 4, the holder 24 has radially outwardly protruding flange portions 25. Each flange portion 25 holds the garter spring 28 by an axial surface thereof between the sprags 26 and also holds the rolling member 27 by the other surface thereof.

As shown in FIG. 4, each sprag 26 is provided with a radially extending stepped portion 26*a* on an axial side thereof adjacent to the rolling member 27, and the garter spring 28 is held on the upper surface 26*b* of this stepped portion 26*a*. The stepped portion 26*a* is formed by plastic working such as pressing or forging. Accordingly, the garter spring 28 urges the sprags 26 against the outer peripheral surface of the inner race 23 through the upper surfaces 26*b* of the stepped portions 26*a*, and gives the sprags 26 a biasing force in a direction to transmit torque between the outer race 22 and the inner race 23.

In the second embodiment, the locations of the stepped portions 26*a* of the sprags 26 differ from those in the first embodiment. Also, the flange portions 25 of the holder 25 axially hold the rolling members 27 and hold the garter spring 28.

Third Embodiment

Figure 5:
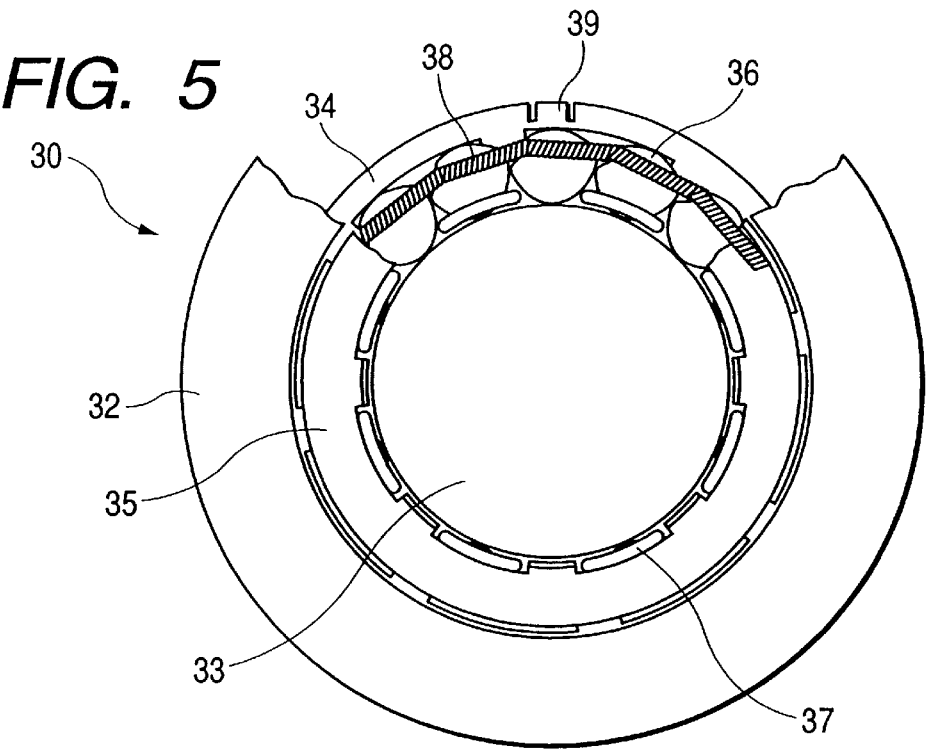
FIG. 5 is a front view of a one-way clutch according to a third embodiment of the present invention.
Figure 6:
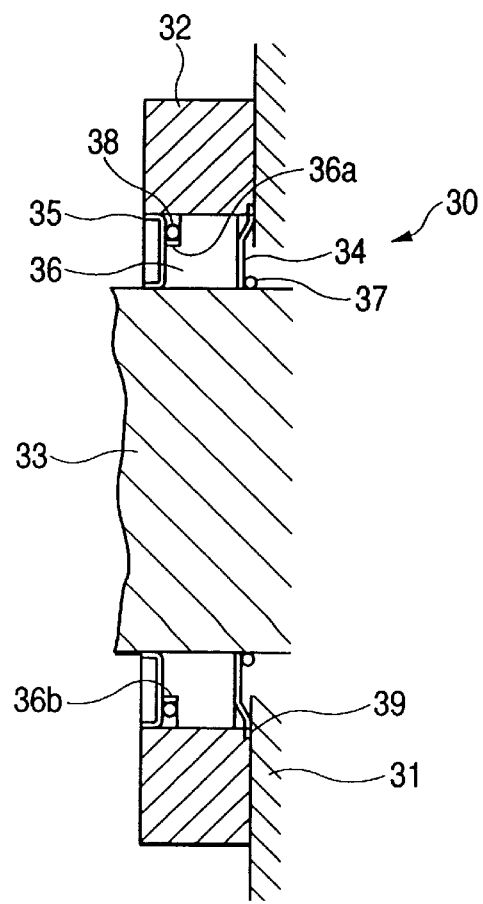
FIG. 6 is an axial cross-sectional view of the one-way clutch of FIG. 5.

FIG. 5 is a front view showing a one-way clutch 30 according to a third embodiment of the present invention, and FIG. 6 is an axial cross-sectional view thereof.

The one-way clutch 30 has an outer race 32, an inner race 33 concentric with the outer race 32 and rotatable relative to the outer race 32, and a plurality of sprags 36 circumferentially equidistantly provided to transmit torque between the outer race 32 and the inner race 33. In the case of the third embodiment, the outer race 32 is fixed to a partner member 31, and the inner race 33 is a solid rotatable member.

In the present embodiment, a wire cage 37 performs the function of a holder. Prior to being inserted between the outer race and the inner race, the sprags 36 are held between a garter spring 38 for giving the sprags 36 a biasing force in a direction of torque transmission (a direction for meshing with the inner peripheral surface of the outer race 32 and the outer peripheral surface of the inner race 33) and a portion of the wire cage 37 bent into a U-shape and provided on the outer periphery of the inner race.

Between the outer race 32 and the inner race 33 at the axially opposite ends of the one-way clutch 30, an annular first side plate 34 is fitted to the partner member 31 side and an annular second side plate 35 is fitted to the opposite side to thereby axially hold the sprags 36 and keep the outer race 32 and the inner race 33 concentric with each other. The first side plate 34 is axially held by the wire cage 37. Also, the outer periphery of the first side plate 34 is fitted to the outer race 32, and a part thereof is a pawl portion 39 which is a resilient piece.

As shown in FIG. 5, each sprag 36 is provided with a radially extending stepped portion 36*a* on an axial side opposite to the partner member 31, and the garter spring 38 is held on the upper surface 36*b* of this stepped portion 36*a*. The stepped portion 36*a*, as in the above-described embodiments, is formed by plastic working such as pressing or forging. Accordingly, the garter spring 38 urges the sprags 36 against the outer peripheral surface of the inner race 33 through the upper surface 36*b* of the stepped portion 36*a*, and gives the sprags 36 a biasing force in a direction to transmit torque between the outer race 32 and the inner race 33.

In the third embodiment, as shown in FIG. 6, the garter spring 38 is axially held between the stepped portions 36a of the sprags 36 and the second side plate 35.

Fourth Embodiment

Figure 7:
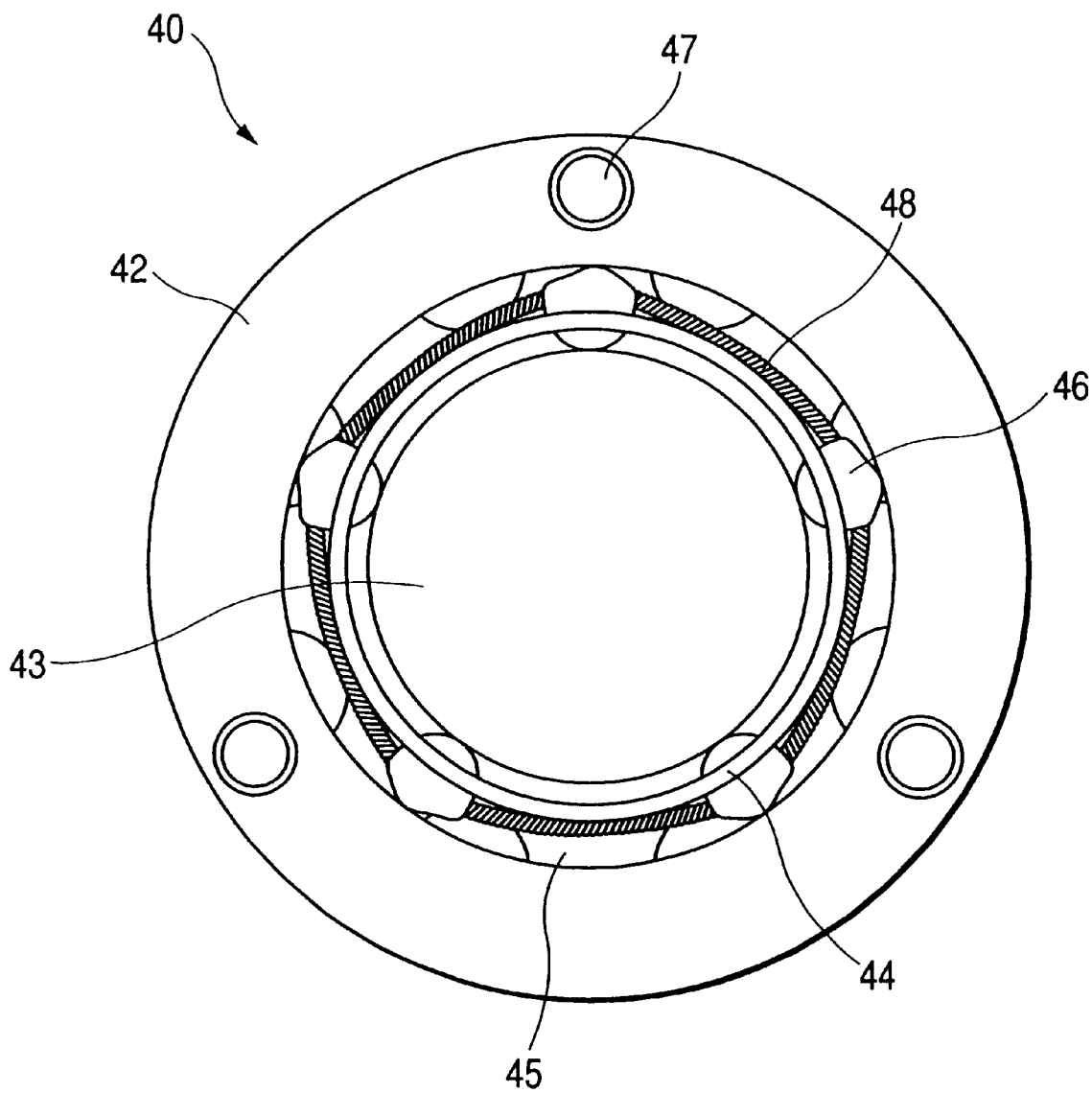
FIG. 7 is a front view of a one-way clutch according to a fourth embodiment of the present invention.
Figure 8:
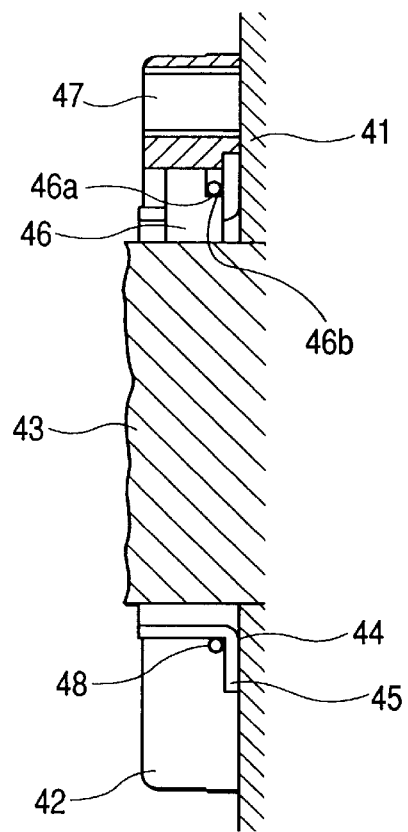
FIG. 8 is an axial cross-sectional view of the one-way clutch of FIG. 7.

FIG. 7 is a front view showing a one-way clutch 40 according to a fourth embodiment of the present invention, and FIG. 8 is an axial cross-sectional view thereof.

The one-way clutch 40 has an outer race 42, an inner race 43 concentric with the outer race 42 and rotatable relative to the race 42, and a plurality of sprags 46 circumferentially equidistantly provided to transmit torque between the outer race 42 and the inner race 43. In the case of the fourth embodiment, the outer race 42 is fixed to a partner member 41 by bolts, not shown, through bolt holes 47, and the inner race 43 is a solid rotatable member.

In the present embodiment, the sprags 46 are held by a holder 44. Prior to being inserted between the outer race and the inner race, the sprags 46 are held between a garter spring 48 for giving the sprags 46 a biasing force in a direction of torque transmission (a direction for meshing with the inner peripheral surface of the outer race 42 and the outer peripheral surface of the inner race 43) and the holder 44.

The annular holder 44 has radially outwardly extending flanges 45 provided circumferentially equidistantly. Also, as shown in FIG. 8, each sprag 46 is provided with a radially extending stepped portion 46a on an axial side of the partner member 41 side, and the garter spring 48 is held on the upper surface 46b of this stepped portion 46a. The stepped portion 46a, as in the above-described embodiments, is formed by plastic working such as pressing or forging. Accordingly, the garter spring 48 urges the sprags 46 against the outer peripheral surface of the inner race 43 through the upper surface 46b of the stepped portions 46a, and gives the sprags 46 a biasing force in a direction to transmit torque between the outer race 42 and the inner race 43.

In the fourth embodiment, as shown in FIG. 8, the garter spring 48 is axially held by the stepped portions 46a of the sprags 46 and the flanges 45 of the holder 44.

In each of the aforedescribed embodiments, the stepped portions of the sprags are provided only on one axial end portion and therefore, the proper orientation of the sprags when incorporated into the one-way clutch can be easily visually confirmed. Also, according to the second and third embodiments, the garter spring is held in both axial directions and therefore, the operation of the garter spring is stabilized.

Figure 9:
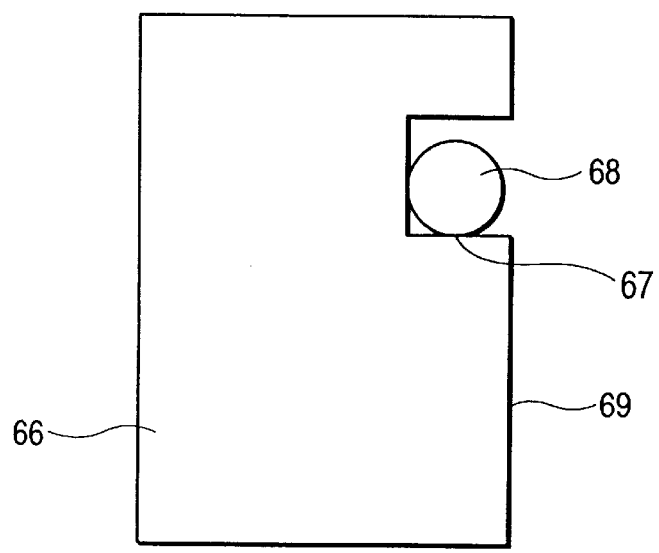
FIG. 9 is a side view of a sprag showing an example of the groove portion of the present invention.
Figure 10:
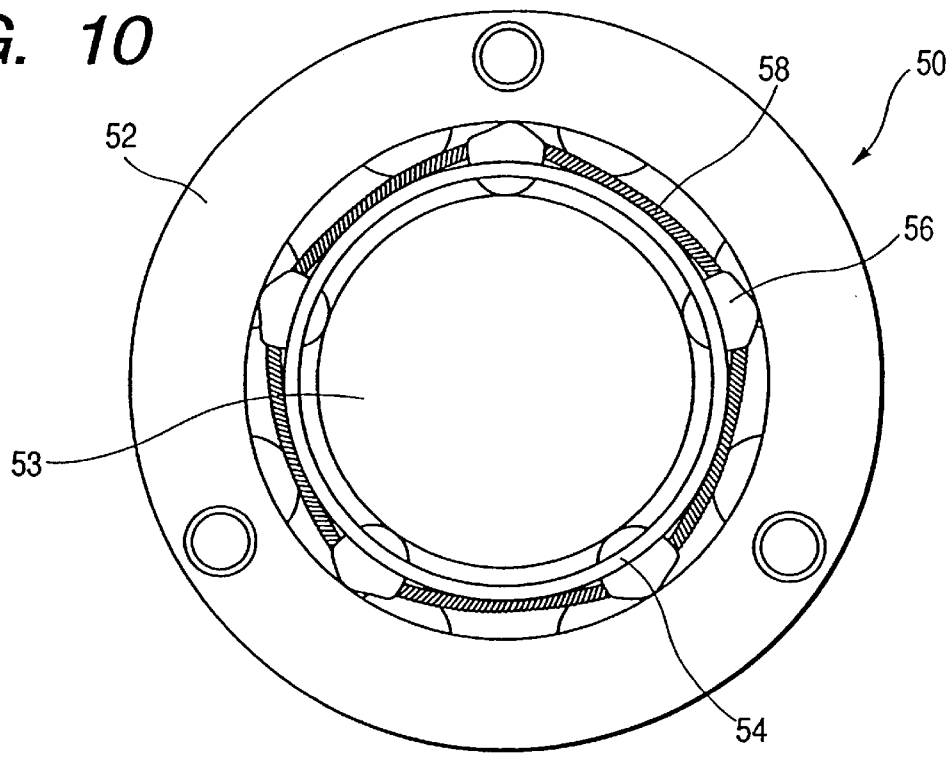
FIG. 10 is a front view of a one-way clutch according to the prior art.
Figure 11:
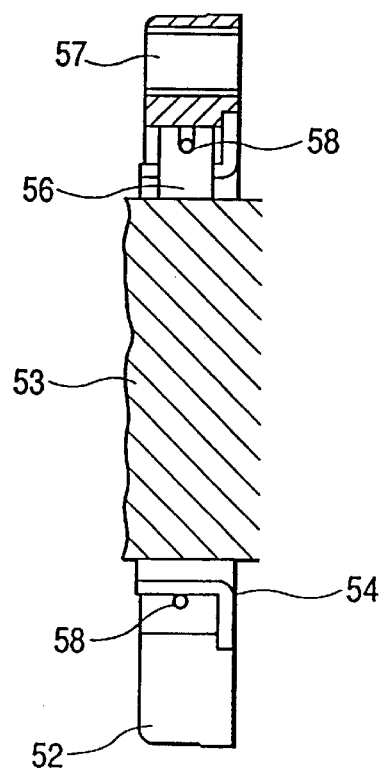
FIG. 11 is an axial cross-sectional view of the one-way cluch of FIG. 10.

While in each of the above-described embodiments, only the stepped portions provided on the sprags are shown as means for holding the garter spring, as an alternative to the stepped portions, a groove 67 having a predetermined depth in the axial direction can be formed in an axial side of a sprag 66 by plastic working and a garter spring 68 can be held in this groove 67, as shown, for example, in FIG. 9. If a side plate or the flange of the holder is made to bear against the end surface 69 of the sprag 66, the garter spring 68 can be axially held. However, the stepped portions may be more preferable because they can be worked more accurately.

Further, it will be appreciated that the (integral bearing type) one-way clutch can of course be applied to any of a type in which the outer race is fixed and the inner race is rotated and a type in which the inner race is fixed and the outer race is rotated.

According to the one-way clutch and integral bearing type one-way clutch of the present invention described above, there are obtained the following effects:

(1) the working property of the stepped portions or grooves of the sprags has been improved and therefore the manufacturing cost can be reduced; and (2) due to the stepped portions or grooves provided only on one side of the sprags, the sprags should not be incorporated into the clutch assembly in an improper orientation since it is easy to ascertain the correct orientation, and therefore the outflow of products having sprags reversely incorporated can be prevented.

What is claimed is:

1. A one-way clutch, comprising an outer race, an inner race disposed for rotation relative to said outer race, a sprag disposed between said outer race and said inner race for transmitting torque, a holder holding said sprag, and a garter spring biasing said sprag in a direction of torque transmission, characterized in that only one axial side of said sprag is formed with a stepped portion or a groove portion, and said garter spring is held on said stepped portion or said groove portion.

2. A one-way clutch according to claim 1, characterized in that said stepped portion or said groove portion is formed by plastic working.

3. A one-way clutch according to claim 2, characterized in that said sprag is disposed in a portion of a wire cage bent into a U-shape, is held between said wire cage and said garter spring, and is axially held by a side plate.

4. A one-way clutch according to claim 2, characterized in that said garter spring is held by said stepped portion or said groove portion and a flange portion of said holder.

5. A one-way clutch according to claim 1, characterized in that said sprag is disposed in a portion of a wire cage bent into a U-shape, is held between said wire cage and said garter spring, and is axially held by a side plate.

6. A one-way clutch according to claim 1, characterized in that said garter spring is held by said stepped portion or said groove portion and a flange portion of said holder.

7. An integral bearing one-way clutch, comprising a one-way clutch portion provided with an outer race, an inner race disposed for rotation relative to said outer race, a sprag disposed between said outer race and said inner race for transmitting torque, a sprag holder holding said sprag, and a garter spring biasing said sprag in the direction of torque transmission, and a bearing portion sharing the outer race and/or the inner race with said one-way clutch portion, and provided with rolling members that roll between said outer race and said inner race and a rolling member holder holding said rolling members, characterized in that only one axial side of said sprag is formed with a stepped portion or a groove portion, and said garter spring is held by said stepped portion or said groove portion and said sprag holder or said rolling member holder.

8. An integral bearing type one-way clutch according to claim 7, characterized in that said stepped portion or said groove portion is formed by plastic working.

9. A one-way clutch, comprising an outer race, an inner race disposed for rotation relative to said outer race, a sprag disposed between said outer race and said inner race for transmitting torque, a holder holding said sprag, and only a single garter spring biasing said sprag in a direction of torque transmission, characterized in that only one axial side of said sprag is formed with a stepped portion or a groove portion configured to receive said garter spring in a state in which said garter spring effects said biasing of said sprag.

10. A one-way clutch according to claim 9, characterized in that said sprag is disposed in a portion of a wire cage bent into a U-shape, is held between said wire cage and said garter spring, and is axially held by a side plate.

11. A one-way clutch according to claim 9, characterized in that said garter spring is held by said stepped portion or said groove portion and a flange portion of said holder.

* * * * *